June 2, 1936.  A. B. WOOD ET AL  2,042,573
POWER TRANSMITTING DEVICE
Filed July 26, 1935  2 Sheets-Sheet 1
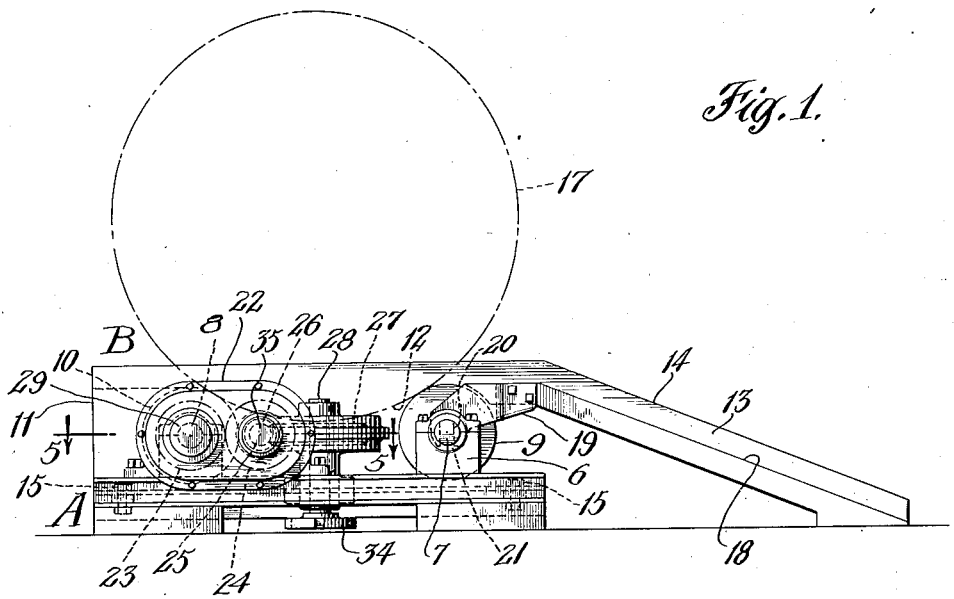
Fig. 1.
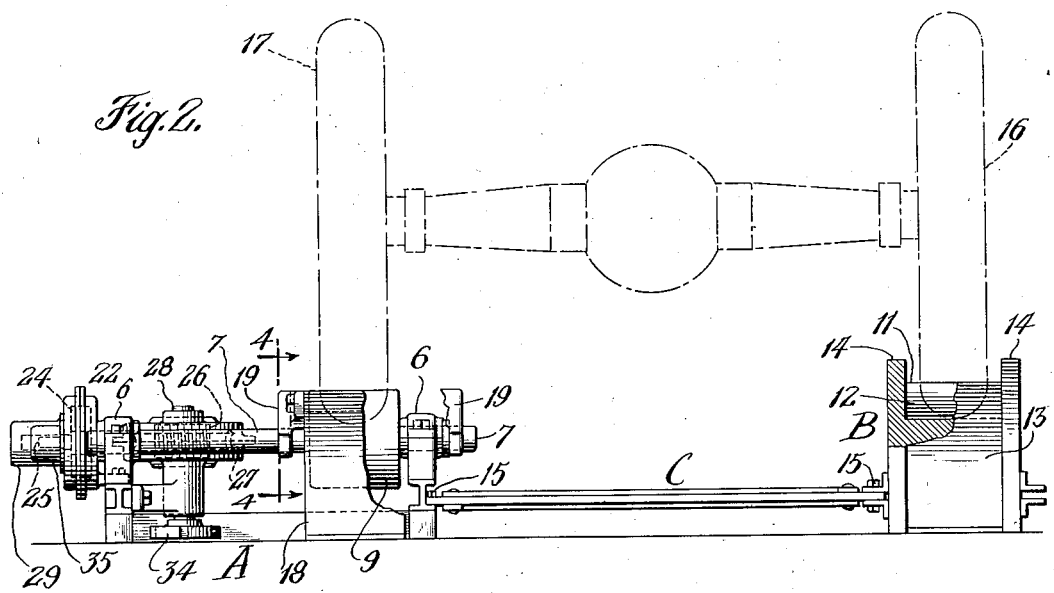
Fig. 2.
Fig. 4.
INVENTORS
Albert B. Wood +
BY Henry Wade Barnett
Synnestvedt & Lechner
ATTORNEYS

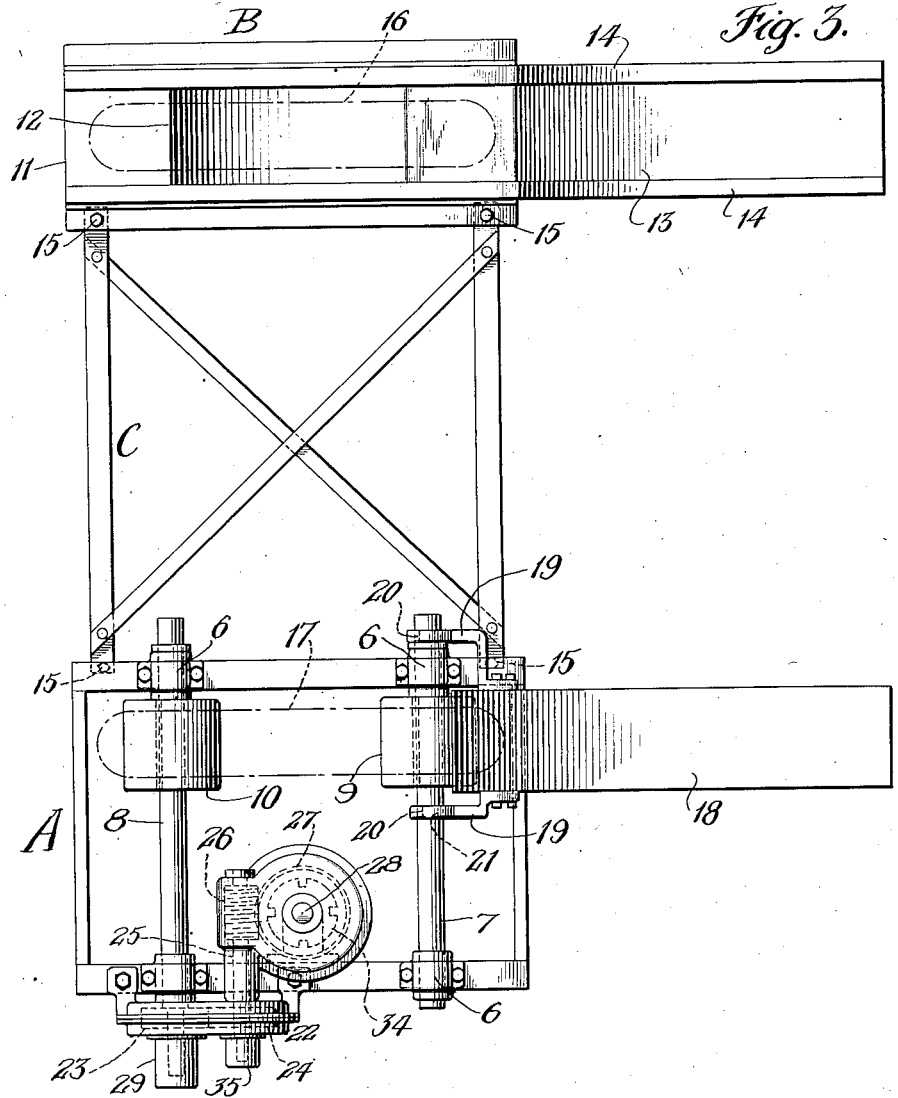
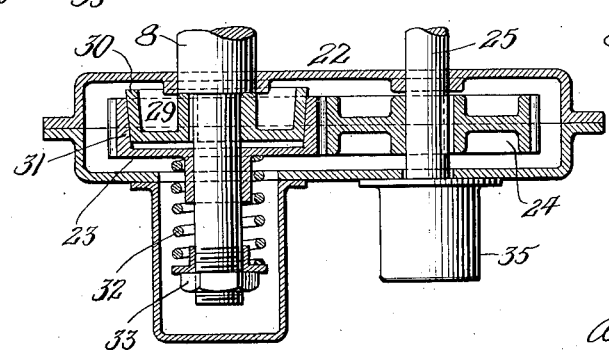

Patented June 2, 1936

2,042,573

UNITED STATES PATENT OFFICE 2,042,573

POWER TRANSMITTING DEVICE

Albert Baldwin Wood and Henry Wade Barnett,
New Orleans, La.

Application July 26, 1935, Serial No. 33,322

1 Claim. (Cl. 74—14)

This invention relates to automobile operated power transmitting devices and has for its primary object the provision of an improved device which is of simple construction, inexpensive to manufacture, and very effective in operation.

Another object resides in the provision of a device of the character described in which the power of the automobile is effectively utilized for the transmission of drive to associated mechanisms without the necessity for extreme accuracy in aligning the various parts of the device itself or in aligning the axle of the power wheels in exact parallelism with the axes of the supporting rollers of the device.

A further object is the provision of a device of the character described in which wear on the driving tire of the automobile is minimized.

Still another object of the invention is the provision of a device of the character described in which objectionable torques or twisting strains are effectively resisted.

How the foregoing, together with such other objects and advantages as may hereinafter appear or are incident to our invention are realized, is illustrated in preferred form in the accompanying drawings, wherein Fig. 1 is a side elevation of a device constructed in accordance with our invention;

Fig. 2 is a front elevation of the device;

Fig. 3 is a plan view of the device;

Fig. 4 is an enlarged fragmentary sectional view taken on the line 4—4 of Fig. 2 illustrating a detail of our invention; and Fig. 5 is an enlarged sectional view taken on the line 5—5 of Fig. 1 illustrating a friction drive employed in the device.

The device comprises in general a base structure A preferably in the form of a rectangular frame of rigid construction, a supporting structure B, and spacer means C for spacing the structures A and B apart laterally.

The base structure A is provided with a plurality of bearings 6 for a pair of shafts 7 and 8 having straight faced or treaded rollers or pulleys 9 and 10 secured thereon to rotate therewith. The rollers rotatably support one of a pair of axially aligned power wheels of an automobile as indicated in dot and dash lines in the drawings. The shaft and rollers are mounted in spaced parallel relation, the spacing being such as will give the desired amount of friction between the power wheel of the automobile and the rollers.

The supporting structure B comprises a supporting portion 11 having a concave or indented surface 12 for receiving the automobile wheel, and a ramp portion or inclined approach 13. This structure is provided with upstanding side flanges 14 and is positioned at a fixed distance from the base structure A by the spacer means C which is detachably secured to the base structure and to which the supporting structure B is detachably secured, as by means of bolts 15. The flanges 14 serve to laterally position the wheel 16 of the automobile and this in turn properly positions the wheel 17 laterally of the rollers 9 and 10 it being pointed out that the spacer C is of such dimension as to laterally space the structure B a distance from the rollers 9 and 10 equal to the gauge of the automobile wheels.

It is pointed out that since the supporting structure B is securely attached to the main or base structure A any torque or twist applied to the power take-off shaft is resisted by the entire weight of the portion of the automobile resting on the structures A and B so that any tendency for the device to move is resisted by the weight of this entire portion of the automobile.

A removable ramp or inclined aproach 18 is associated with the rollers 9 and 10 and is provided with arms or brackets 19 at its upper end portion adapted to engage the shaft 7. This shaft is provided with flats 20 located to be engaged by the slots 21 of the arms 19. Thus when the ramp 18 is in place to serve as an approach to the rollers the shaft 7 with the roller 9 is locked against rotation to facilitate running the wheels onto the rollers and supporting structure B. After the automobile is in power transmitting position on the apparatus the ramp 18 is removed to permit the roller 9 to rotate.

In this instance the shaft 7 is an idler shaft and the shaft 8 the power transmitting shaft of the device. We prefer to associate reduction gear mechanism such as indicated at 22, with the shaft 8 and comprising a gear 23 on the shaft 8 meshing with a gear 24 on the shaft 25 having a worm 26 for driving a worm wheel 27 secured on the shaft 28 which constitutes the power take-off shaft of the device. In the particular arrangement of gear mechanism illustrated the power take-off shaft is vertically disposed.

A friction drive 29 is incorporated in the gear mechanism comprising an external friction cone 30 keyed on the shaft 8, an internal hollow friction cone 31 formed integral with the gear 23 which is mounted to rotate freely on the shaft 8, and an adjustable spring 32 for holding the cone 31 in contact with the cone 30. The tension of the spring may be regulated by means of an adjusting nut 33 and this tension determines the load that can be transmitted by the friction drive. The employment of a friction drive is of particular importance when the device is used to power operate mechanisms, such as large valves where it is essential, in order to avoid binding or breakage, to prevent too great an amount of power being applied to the valves.

Any suitable means, such, for example, as a coupling or clutch member 34 may be provided on the power take-off shaft 28, for convenience in connecting the mechanism to be driven to the power transmitting device. As indicated at 35 a counter may be attached to one of the shafts to indicate the number of revolutions of the device.

A convenient mode of operation is to so position the base structure A that the power take-off shaft 28 is in proper power transmitting relation to the mechanism to be operated and then to attach the supporting structure B thereto by means of the spacer means C. The removable ramp 18 is then set in place and an automobile is driven up the ramps 13 and 18 until one of the pair of power wheels rests on the supporting portion 11 of the structure B and the other rests on the rollers 9 and 10. After the automobile is in place the ramp 18 is removed and the device is ready for operation. Rotation of the power take-off shaft may be in either direction and at various speeds as by shifting the usual transmission gears of the automobile.

We are aware that automobile operated power transmitting devices have been proposed heretofore but all of those with which we are familiar employ dished or flanged rollers for positioning the automobile wheels. Such devices, however, cause heavy wear on the automobile tires and by actual experience have not proven to be fully effective and in addition it is very essential that the axle of the automobile wheels be exactly parallel with the axes of the rollers of the power transmitting mechanism, if the wheels are to be maintained in proper operating position on the device. Thus these devices if constructed with the accuracy necessary for them to be of the effectiveness desired are very costly to manufacture.

By employing straight faced or treaded rollers and by laterally positioning the wheel which rotates on the rollers from the non-rotatable wheel which is guided and gauged by the supporting structure B in accordance with our invention, extreme accuracy in aligning the wheel axle in parallelism with the axes of the rollers is not essential since the tires of the wheels only contact the rollers on a very narrow face. Stated in other words there is substantially only line contact between the automobile power wheel and the rollers and, therefore, exact parallelism is not prerequisite. It is also to be observed that the rollers 9 and 10 are of sufficient width to permit of having liberal clearance between the automobile wheel 16 and the guiding flanges 14 of the supporting structure B. Such clearance is advantageous in that extreme care is not required in running the automobile onto the device. The device is accommodated for use with different automobiles in which the sizes of the tires may vary considerably and may even be effectively used with automobiles in which the wheels are no longer properly aligned. It will be seen, therefore, that we have provided a device which is very effective in transmitting power and which may be very economically constructed.

What we claim is:

An automobile operated power transmitting device comprising base structure; spaced parallel shafts rotatably mounted on said base structure; a straight tread roller non-rotatably mounted on each of said shafts for rotatably supporting one of a pair of axially aligned power wheels of an automobile; ramp means comprising a recessed portion for receiving and non-rotatably supporting the other of said pair of power wheels, an inclined approach to said recessed portion, and guide means for laterally positioning said pair of power wheels with the first mentioned power wheel in effective driving contact with the rollers; an inclined approach leading to said rollers; and means for detachably supporting said last mentioned inclined approach from the adjacent one of said parallel shafts comprising arms on said approach, and flats on said shafts engageable by said arms to lock said shaft with its roller against rotation when the approach is in place.

ALBERT BALDWIN WOOD.
HENRY WADE BARNETT.